United States Patent Office

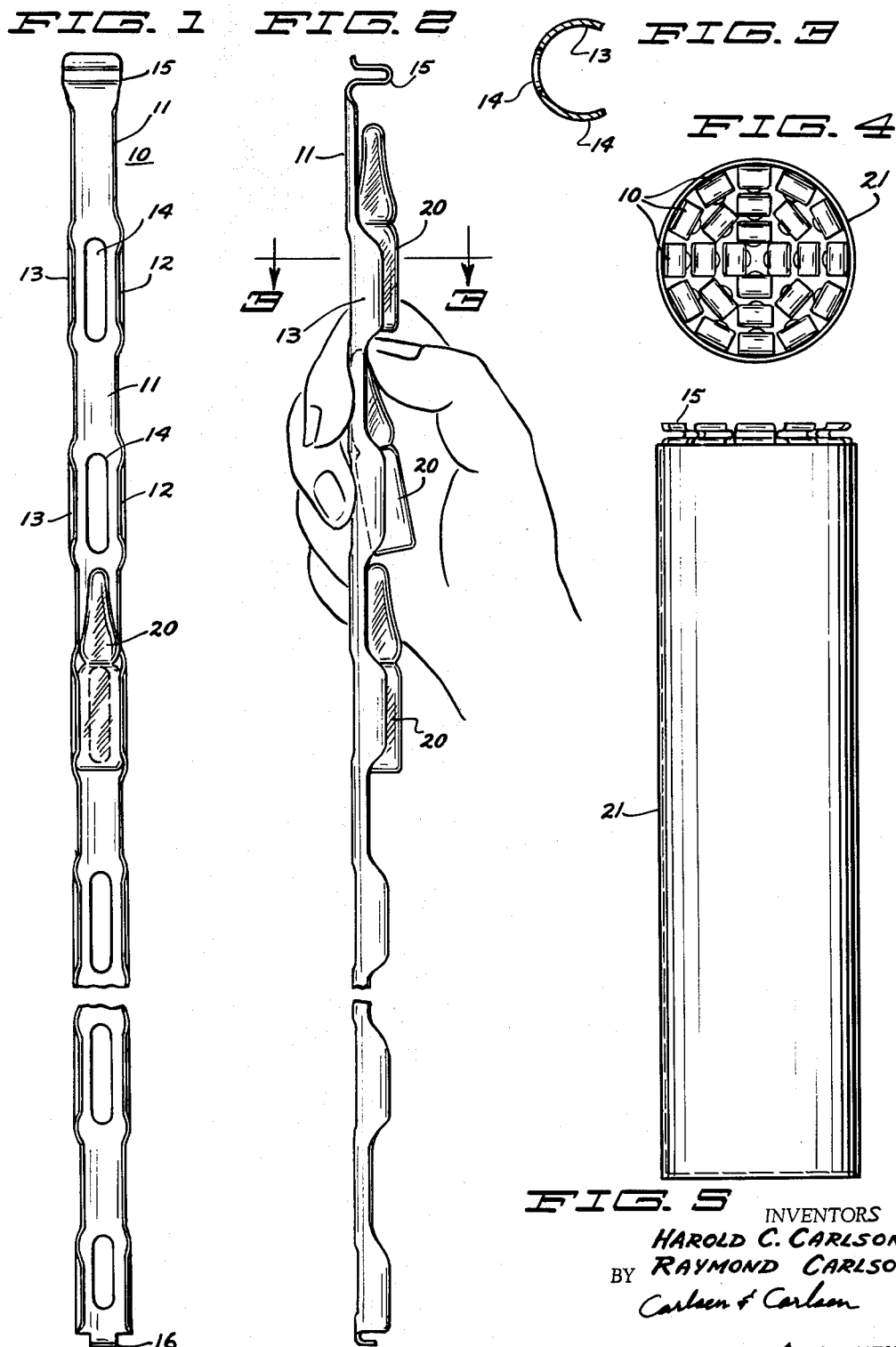

3,207,212
Patented Sept. 21, 1965

3,207,212
ARTICLE CARRIER
Harold C. Carlson and Raymond Carlson, both % Shur-Bend Mfg. Co., 3525 Noble Ave., Minneapolis, Minn.
Filed Dec. 21, 1961, Ser. No. 161,104
6 Claims. (Cl. 165—80)

This invention relates generally to article carriers and is more particularly directed to devices of this general class for removably receiving and holding fragile articles for transportation and for processing wherein heat transferring operations may be utilized.

In the present state of the art many materials and substances are contained in articles fashioned of fragile material, such as glass, examples of which are the ampule or vial utilized in the field of medicine. Such articles are generally of substantially cylindrical shape over the major portion thereof and may or may not have a completely sealed neck portion of smaller cross sectional area for providing convenient access to the contents. These articles may be found in various standard sizes and shapes dependent upon the nature of the use to which the material contained therein is to be put. In many instances, it is necessary to perform further operations on the material contained within the vial either for completing a process or for providing satisfactory storage before use. Since the container articles are generally sealed after the material has been inserted, the almost universal requirement in subsequent use is an efficient and adequate means of transferring heat into or out of the interior of the container. Further, the relatively fragile nature of the containers creates a need for ease of handling while providing suitable protection for the container while it is being handled by various individuals and/or machines.

The present invention provides such an article carrier having the desirable characteristics as outlined above. It may be fashioned of one of a number of suitable materials and is readily adaptable for use with container articles of varying size and shape and further may be produced in an economical manner so as to provide for varying capacities of number of articles carried thereby.

It is therefore an object of the present invention to provide a new and useful article carrier.

It is another object of this invention to provide an article carrier in which ease of removal of articles is increased while retaining a higher degree of heat transferring engagement between the article and the carrier.

A still further object of the present invention is to provide an article carrier which may be produced in varying sizes and for varying capacity of number of articles to be carried thereby.

It is still a further object of the present invention to provide an article carrier which may be conveniently formed of a single piece of material to provide a unitary structure.

Another object of the present invention is to provide an article carrier which provides a high degree of protection for the articles contained therein and a convenient means for handling of a plurality of small articles during transportation and manufacturing processes.

These and other more detailed and specific objects will be disclosed in the course of the following specification, reference being had to the accompanying drawings, in which—

FIG. 1 is a front elevational view of one embodiment of our invention.

FIG. 2 is a side elevational view of the embodiment of FIG. 1.

FIG. 3 is a cross sectional view taken along the section lines 3—3 on FIG. 2.

FIGS. 4 and 5 are an elevation and top view of a plurality of the article carriers shown in the first three figures within a container for transportation or further processing of the material contained therein.

Referring now to FIGS. 1, 2 and 3 in which like elements are identified by like reference characters, the article carrier may be seen to be made up of a single piece of material containing alternate lengths, or areas of semi-circular or arcuate cross section and is provided with a clip member at one extremity for use in holding and handling the carrier.

More specifically article carrier 10 is made up of a plurality of alternate areas 11 of arcuate cross section and a plurality of pairs of members 12 and 13 of semi-circular or arcuate cross section. A stop member 16 extends upwardly from the bottom of the carrier at one extremity and a generally U-shaped clip member 15 is positioned at the other extremity for use in holding and inserting and removing the article carrier from various containers into which it may be placed. In FIG. 2 a plurality of ampules are indicated by the reference character 20. A plurality of perforations, indicated by reference character 14, and having a generally elongate shape along the longitudinal axis of carrier 10 are provided at positions arcuately intermediate the pairs of article engaging and holding members 12 and 13.

Article carrier 10 may be fashioned of any suitable material having a substantial heat transferring characteristic and which provides a certain amount of resiliency at least in the areas of members 12 and 13. It has been found that a suitable material for this purpose is aluminum which may be used in varying degrees of hardness dependent upon the relative diameter or cross section of the articles to be inserted therein.

It is, of course, desirable to maintain a certain amount of rigidity of members 12 and 13 so as to provide substantial protection for articles engaged thereby and it has been discovered that the provision of the perforations indicated by reference numerals 14 greatly increase the ease of insertion and removal of the articles to be carried. As indicated on FIG. 2, the removal of the center ampule 20 may be easily accomplished by merely pushing at the top end thereof by the thumb of a human operator when the article carrier 10 is grasped between the fore finger and thumb. It will be noted that the arcuate dimension may preferably be slightly greater than half circular so as to increase the engagement with an article such as ampule or vial, 20.

In FIGS. 4 and 5 a plurality of article carriers 10 are shown positioned within a container 21 for storage, transportation or further processing. It may be noted that the substantially circular shape of the major portion of the article carrier 10 allows for maximum density for any given size or shape of container. It is anticipated that container 21 may also be provided with suitable openings or perforations for better heat transfer between a source of heat or refrigeration and the articles positioned within. In one specific application of the subject of this invention, ampules filled with a material requiring a relatively low storage and transportation temperature are packed in containers which are immersed in a tank of nitrogen in the liquid state. The containers are continuously agitated to aid in heat transfer and, would of necessity, be subject to some degree of rough handling. It has been observed that the relative amount of breakage and/or spoilage, has been materially reduced while the ease of handling of the individual articles is substantially increased through application of our invention.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. A carrier for detachably receiving and protecting a plurality of fragile ampules comprised of an arcuately shaped, longitudinally elongated member having a plurality of pairs of arcuately shaped extensions disposed at longitudinally spaced predetermined locations said member and said extensions being comprised of material exhibiting resilience and heat conductivity characteristics and said extensions being spaced to permit individual ampules to be received and detached therefrom.

2. The carrier of claim 1 in which a longitudinally elongated perforation is disposed in the member intermediate the extensions of each of said pairs of extensions and in cooperating relationship thereto.

3. The carrier of claim 1 in which the longitudinal dimension of each of the pairs of extensions is substantially less than the length of ampules to be detachably received therebetween whereby engagement of the neck of an individual ampule and movement thereof toward the member serves to detach the ampule from engagement with a pair of extensions.

4. The carrier of claim 2 in which the longitudinal dimension of each of the pairs of extensions is substantially less than the length of ampules to be detachably received therebetween whereby engagement of the neck of an individual ampule and movement thereof toward the member serves to detach the ampule from engagement with a pair of extensions.

5. The carrier of claim 1 in which the longitudinal spacing of corresponding portions of the pairs of extensions is greater than the length of an ampule to be received therebetween.

6. The carrier of claim 2 in which the longitudinal spacing of corresponding portions of the pairs of extensions is greater than the length of an ampule to be received therebetween.

References Cited by the Examiner

UNITED STATES PATENTS

| | | | |
|---|---|---|---|
| 2,212,139 | 8/40 | Rust | 211—49 |
| 2,598,492 | 5/52 | Boes | 206—65 |

ROBERT A. O'LEARY, *Primary Examiner.*

CHARLES SUKALO, *Examiner.*